US008841986B2

(12) United States Patent
Holman

(10) Patent No.: US 8,841,986 B2
(45) Date of Patent: Sep. 23, 2014

(54) CONSUMER INTERACTIVE MUSIC SYSTEM

(76) Inventor: Jeffrey T Holman, Farmington, UT (US)

( * ) Notice: Subject to any disclaimer, the term of this patent is extended or adjusted under 35 U.S.C. 154(b) by 712 days.

(21) Appl. No.: 13/030,074

(22) Filed: Feb. 17, 2011

(65) Prior Publication Data

US 2011/0199180 A1 Aug. 18, 2011

Related U.S. Application Data

(60) Provisional application No. 61/305,505, filed on Feb. 17, 2010, provisional application No. 61/384,585, filed on Sep. 20, 2010.

(51) Int. Cl.
*H04B 1/20* (2006.01)
*G08C 17/00* (2006.01)

(52) U.S. Cl.
CPC ............ *G08C 17/00* (2013.01); *G08C 2201/42* (2013.01)
USPC ........... 340/4.42; 379/67.1; 379/68; 379/162; 379/163; 379/265.09; 379/266.06; 455/412.1; 455/514; 455/422.1

(58) Field of Classification Search
CPC ....... G08C 23/04; G08C 2201/40; H04Q 9/00
USPC ........................................................ 340/4.42
See application file for complete search history.

(56) References Cited

U.S. PATENT DOCUMENTS

| | | | | |
|---|---|---|---|---|
| 8,230,099 | B2 * | 7/2012 | Weel | 709/231 |
| 8,281,027 | B2 * | 10/2012 | Martinez et al. | 709/231 |
| 2003/0174818 | A1 * | 9/2003 | Hazenfield | 379/88.22 |
| 2006/0188087 | A1 * | 8/2006 | Kortum et al. | 379/266.01 |
| 2007/0047711 | A1 * | 3/2007 | Florkey et al. | 379/162 |
| 2008/0239887 | A1 * | 10/2008 | Tooker et al. | 369/30.06 |
| 2009/0150433 | A1 * | 6/2009 | Uusitalo et al. | 707/104.1 |

* cited by examiner

*Primary Examiner* — George Bugg
*Assistant Examiner* — Anthony D Afrifa-Kyei
(74) *Attorney, Agent, or Firm* — Jeffrey T. Holman

(57) ABSTRACT

A user-interactive music system is described. The system includes a web application in communication with an electronic device such as a mobile device. The web application receives an input from the electronic device, requesting a specific song or preference of songs be played on a music player at a remote location. The web application communicates with a music player, communicating the requests from the electronic device. The music player plays the requested songs or preference of songs on the music player.

5 Claims, 5 Drawing Sheets

CONSUMER INTERACTIVE MUSIC SYSTEM

CROSS-REFERENCE TO RELATED APPLICATIONS

This application claims the benefit of U.S. Provisional Application No. 61/305,505, filed on Feb. 17, 2010, and U.S. Provisional Application No. 61/384,585, filed on Sep. 20, 2010, which are incorporated by reference herein in their entirety.

BACKGROUND

Many stores, restaurants, and venues utilize a sound system to play music. As a source of music, many of these venues use the radio, custom playlists, on-hand audio files, or other forms of databases for playing their music. The choice of which music to play typically comes from the owners or operators of stores or other venues, with little or no input from people at respective locations. As a result, many venues play music that is does not conform to the interests of the people who are present at the venue's location.

SUMMARY

Embodiments of a system are described. In one embodiment, the system is a user-interactive music system. The music system includes a web application in communication with an electronic device, possibly a mobile device. The web application is configured to communicate with a music player at a remote location. The music player may be operated by a separate party than the electronic device or the web application. The web application is configured to receive a request to play a song on the music player. The web application is also configured to playback the song on the music player.

Embodiments of an on-hold music playback system are also described. In one embodiment, the system includes a web application in communication with a mobile consumer device. The web application is configured to communicate with a playlist server at a remote location. The web application is also configured to recognize an on-hold status indicating that a user is on hold with a third party phone system. The web application also selects a song from the playlist server based on the request or user preferences of the mobile consumer device. The web application is also configured to playback a requested song to the mobile consumer device.

Embodiments of an on-hold music playback system are also described. In one embodiment, the system includes a mobile communication device. The communication device includes logic at least partially implemented in hardware. The logic is configured to facilitate a voice communication session between the mobile communication device and a third party user. The logic further recognizes the beginning of an on-hold status. The logic is also configured to playback music stored on the mobile communication device to the user of the communication device in response to the beginning of the on-hold status.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
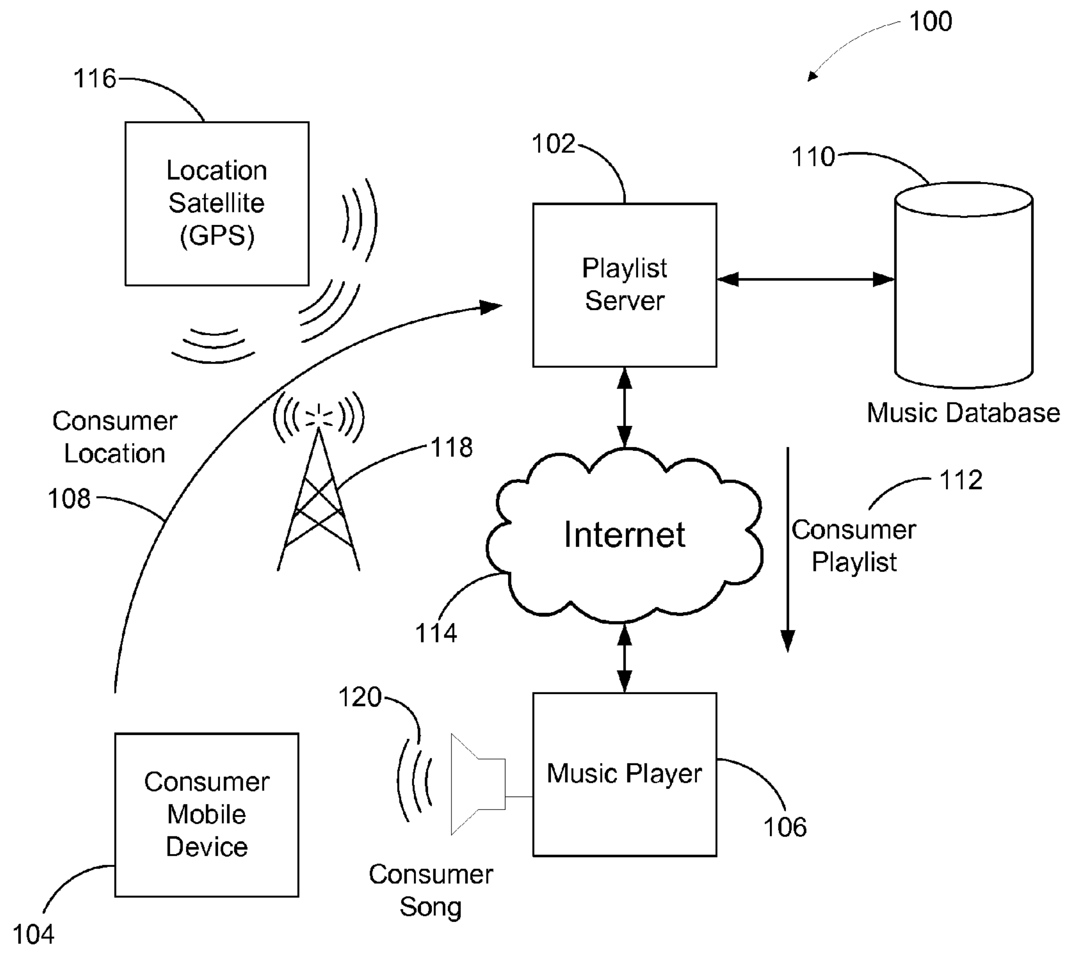
FIG. 1 shows an embodiment of a location based consumer-specific music broadcasting system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the embodiments implement software products which, when implemented on a computer device, perform operations to allow a mobile subscriber to manage or influence music playback at a commercial location (or other location) that has on-site music playback. Physical and tangible embodiments of the functionality described herein can be used in conjunction with music playback systems in restaurants, retail stores, clubs, elevators, and other commercial locations that play ambiance music that is broadcast to one or more consumers at these locations.

FIG. 1 illustrates one embodiment of a consumer interactive music system 100. The system 100 includes a mobile device 104. The mobile device 104 may send an input 108 to a playlist server 102 requesting that a music player 106 at a remote location play a specific song. The input may be sent from the mobile device 104 through a base station 118 or via mobile or web application that utilizes, for example, the GPS location of the mobile device 104. The mobile device 104 may be any electronic device, mobile or stationary, capable of transmitting an electronic signal, such as a desktop computer, kiosk, laptop, notebook, cell-phone, or other handheld electronic device. In the illustrated embodiment, the playlist server 102 selects the song request 108 from a music database 110 and transmits the requested song or consumer playlist 112 over the internet 114 to a music player 106. The music player 106 then plays the requested song 120 for the consumer. If there are multiple requests 108, then the playlist server 102 may maintain a queue of songs or a playlist 112, and send songs or the entire playlist 112 in any order to the music player 106.

Figure 2:
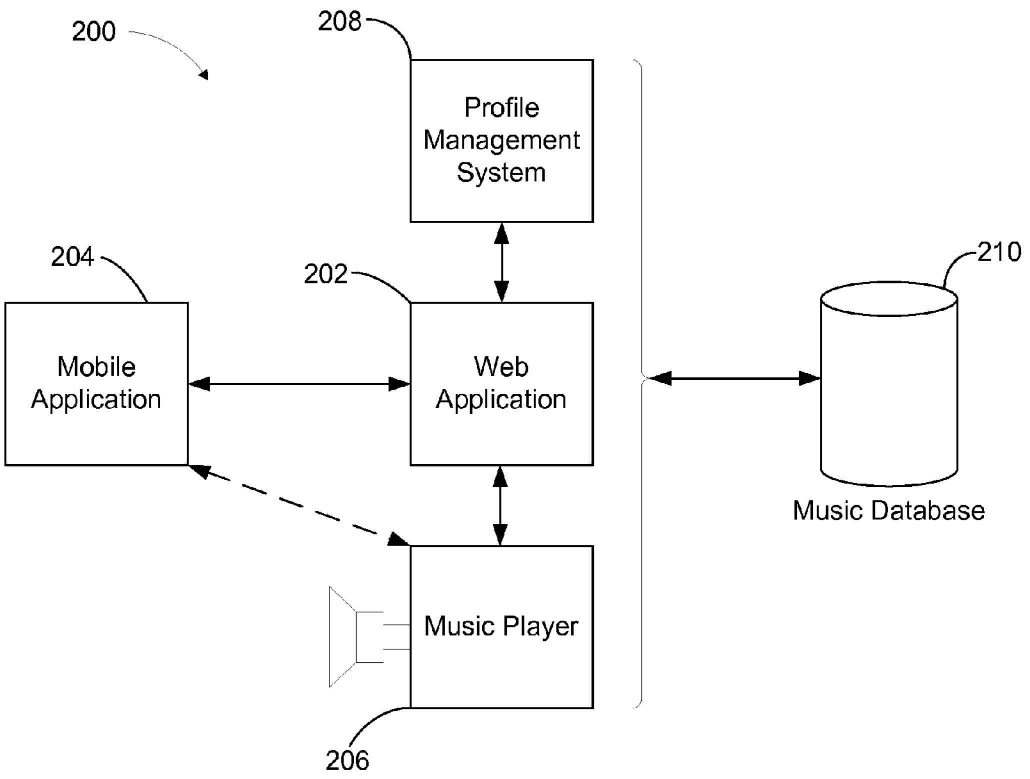
FIG. 2 shows an embodiment of a consumer-interactive music system.

FIG. 2 illustrates one embodiment of a consumer interactive music system 200. The system 200 includes a web application 202 in communication with a mobile application 204. The mobile application 204 sends an input to the web application 202 requesting a specific song. The web application 202 communicates the song preference to a music player 206 which plays the song preference at a remote location. The web application 202 may draw selections of music from a music database 210, which may be located on the user's mobile device 104, at the same location as the music player 206, or at another remote location. The illustrated embodiment also includes a profile management system 208 which may collect data and store user profiles for multiple locations.

Figure 3:
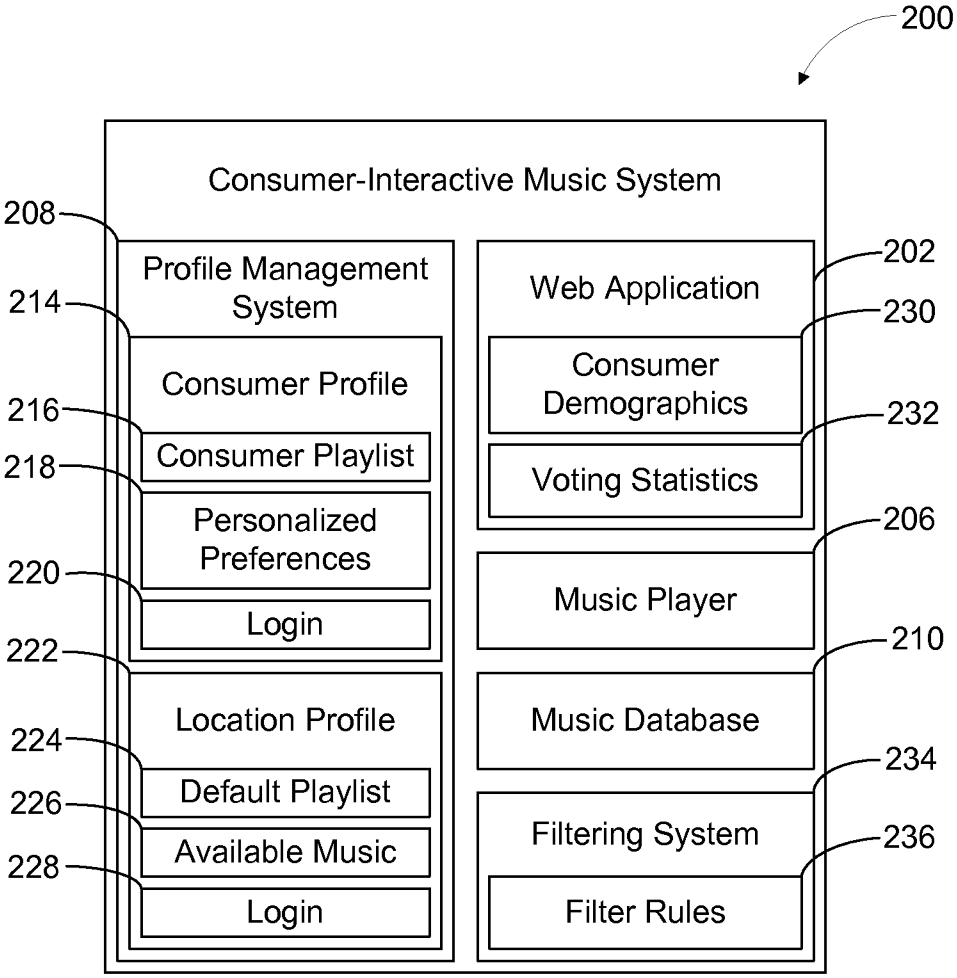
FIG. 3 shows another embodiment of a consumer-interactive music system.

FIG. 3 illustrates one embodiment of a consumer interactive music system 200. The system 200 includes a web application 202 capable of storing and utilizing different types of information, such as consumer demographics 230 and voting statistics 232. The system also includes a profile management system 208 which may store and utilize a consumer profile 214 based on the specific users of the mobile application 204 and a location profile 222 based on the location of the music player 206. The consumer profile 214 may store and utilize features such as a consumer playlist 216, personalized preferences 218, and a login system 220. The location profile 222 may use a default playlist 224 based on typical user preferences or available music 226 and/or a login system 228 for determining preferences of users on location. The illustrated system also includes a music player 206 for playing the music and a music database 210 providing a source of music. The system 200 may also include a filtering system 234 for avoiding inappropriate music, avoiding repeats, or conforming to other identified rules 236 of playback. Additional embodiments incorporating many of these features are also described herein.

The consumer interactive music system 200 may also incorporate customized introductions which broadcast a personal message recognizing the identified consumer. For example, the system 200 may broadcast a message such as "This song is brought to you from the playlist of [consumer]." The consumer could set a user preference 218 indicating whether or not to activate this function. Similarly, the business could set a preference indicating whether or not to use this functionality.

In one embodiment, the location-based services allow the consumer to login 220 or "check in" to a profile management system 208 via the mobile application 204. The consumer may set preferences, select song requests, or simply browse a selection of playable music. The profile management system 208 communicates with the music system 200 to indicate to the music system 200 which songs to play. The consumer may check in either over an Internet connection or over a local area network (LAN) connection. Alternatively, the location where the music is to be played may have a kiosk or computer interface where a consumer may sign in 228 to a location profile management system 222. In yet another embodiment, the mobile application 204 is able to communicate directly with the music player 206 at the location of the music player 206 to make song requests over a local connection, such as a LAN or Wi-Fi connection, or a peer-to-peer (P2P) connection.

In one embodiment, the profile management system 208 is hosted on a remote, third party system that services music management systems 200 at multiple locations. Consumers may log into the profile management system 208 at any time via, for example, a web application 202, and the consumer may identify the consumer's present location to the profile management system 208. When the consumer is at a location having a music system 200 as described herein, the profile management system 208 may indicate to the music system 200 at the location that the consumer is at the same location. This may be done manually with a login function on the interface of the mobile device 104 or by sending the GPS location of the mobile device 104 to the web application 202 or profile management system 208. The web application may also use a combination of login information and GPS locations to determine proximity of the user to the music system 200 or music player 206 and determining the applicable music player 206 or profile management system 208. In some embodiments, additional local handshake communications may be implemented between the music system 200 and the subscriber's mobile application 204 to verify that the subscriber is actually at the same location as the music system 200. Other embodiments may implement other location verification techniques to verify that the subscriber is at the same location or at a nearby location.

The music system 200 and/or profile management system 208 may keep track of statistics, such as a number of consumers currently logged into the profile management system 208, the songs being played, how often a particular song is played, the most requested songs/genres, consumer demographics 230 (such as age and/or gender), and others. The profile management system 208 may also track consumers by name, in some embodiments, if the consumers so choose. In one embodiment, the profile management system 208 also tracks other consumer activities (e.g., purchases by consumers) and stores this information, or other derivative information, for subsequent reference. Tracking such statistics may allow the music system 200 to customize the music to the audience at a particular location. The statistics may also aid the location in tailoring in-store advertisements to a certain demographic 230.

In one embodiment, the music system 200 and/or profile management system 208 may keep track of statistics, such as songs being played, how often songs are played, the number of requests for specific songs, consumer demographics 230 (such as age, gender, etc.), and other statistics for different consumer events. Consumer events could be specific sales, time periods (such as morning, afternoon, evening), seasonal periods, or other events where different consumer demographics are present, and track varying statistics of specific consumer events. Tracking consumer event statistics may allow the music system 200 to generate a plurality of default playlists 224 for different events, aiding the music system 200 in tailoring in-store advertisements or music preferences to a certain events.

In one embodiment, the profile management system 208 also keeps a profile 222 for each location having a music system 200 as described herein. The location profile 222 may include information pertaining to the location that is helpful in determining the music to be played. This may include the name of the location, the type of business or place at the location, a purpose for the music, an intended demographic, allowed music or blocked music according to a customizable set of filter rules 236, and other relevant information.

In one embodiment, the consumer installs a local, mobile application 204 on the consumer's mobile device or device 104. The mobile application 204 may communicate with a remote, web application 202. The web application 202 may be a general web application that services a large number and variety of locations having music systems 200, or the web application 202 may be tailored to a specific location or group of locations. In another embodiment, the web application 202 is a local application unique to the location where the music system 200 is located. The mobile application 204 allows the consumer to request songs, etc. from the mobile device 104. The mobile application 204 may store personal preferences 218 for the consumer locally so that the consumer is able to modify preferences or create playlists from the mobile device 104 to be accessed anytime the consumer visits a particular location. The mobile application 204 may also allow the consumer to access the profile management system 208 and edit his profile 214 from his mobile device 104. In one embodiment, the music system 200 accesses the music or playlists from the consumer's mobile device to determine song requests. The music system 200 may be allowed to access the music directly from the mobile device 104 for playback at the location.

In one embodiment, a music database 210 is included in the profile management system 208. By collecting data about demographics 230 in relation to a particular location, the profile management database 208 may be able to construct playlists for the location. In an embodiment, the location establishes a data streaming channel with the music database 210, such that the music is streamed at the location. Alternatively, the location may download the entire music files from the music database 210 according to customized playlists so that the music is stored at the location. In another embodiment, where permitted by applicable laws and regulations, music from a subscriber's device 104 may be shared with the local music system directly. For example, a copy of the subscriber's music files may be copied from the subscriber's device 104 to the local music system for playback. Alternatively, one or more of the subscriber's music files may be streamed from the subscriber's device 104 to the local music system 200.

In one embodiment, the location collects consumer statistics and purchases hard copies of albums or customized compact discs (CDs), and the hard copies may then be shipped to the location. In this embodiment, the hard copies may not allow the songs to be played at the location immediately upon request by a consumer, but the hard copies may be useful for constructing default playlists 224 or for easier access to the songs upon future consumer requests. The music system 200 may play songs from a default playlist 224 if there are currently no customer-requested songs queued to play, or the music system 200 may mix customer-requested songs into the default playlist 224. The music system may also define rules for interrupting the music for announcements, advertisements, or emergencies. Also, the music system 200 may define rules for allowing user music to interrupt and/or override default music playback (i.e., playback of music that is not a result of another user's request). For example, the music system 200 may define a rule to instantly stop playback of the default music, wait for a specified delay period, and then begin playback of the subscriber's requested music. As another example, the music system 200 may define a rule to fade out the default music over a fade-out time period, and then begin playback of the subscriber's requested music. Other embodiments may define other transition rules for the music system 200. The location may pay a fee for rights to broadcast the songs over the music system, whether the fee is charged to the profile management system 208 or to another entity holding the music rights.

The music system may include a filtering system 234 that receives play requests by consumers and determines whether each request conforms to a set of filter rules 236. For example, the filter system 234 may include a list of prohibited albums or songs that include explicit lyrics as defined by a rating system. Alternatively, the filter rules 236 may allow some genres of music to be played over the music system and/or block some genres of music from being played. The genre of a particular song may be identified in the song file metadata. The filter rules 236 may also block music/media files that do not have a specific genre listed in the metadata. The filtering system may 234 be implemented based on a profile of the location 222 where the music is being played. The profile 222 may be updated and customized by authorized personnel. The filtering system 234 may also allow songs based on music rights obtained by the location. The filter 234 may also store information about a particular song, including how often the song has been played and when it was most recently played, in order to determine when to allow the song to be played again. In some embodiments, the filtering system 234 can institute a minimum threshold of time, number of songs, or other quantifiable measurement between repeats of the same song, artist, and so forth. As one example, the filtering system 234 may set a limit on the number of songs that can be requested by a specific subscriber within a determined time period.

Another embodiment of the music system 200 includes a voting system. Through the voting system, consumers at the location may be able to vote on songs that are played on the music system 200. The voting process may include voting for or against a song, or ranking the song on a scale, and may be done through a mobile application 204 that consumers have installed on their mobile devices 104. The popularity of a song may determine how often it is played. Songs with high voting statistics 232 may be played more frequently than songs with low voting statistics 232. Thus, the thresholds established in the filtering implementations may be autonomously and/or dynamically adjusted in response to consumer voting or other criteria. In an alternative embodiment, the location may have a kiosk or computer interface in communication with the music system 200 that allows the consumers to vote and/or select music preferences or requests.

The music system 200 may also allow a location to play several songs at once over different channels. This may be useful in a large store with multiple departments or multiple rooms. For example, a department clothing store may have a different playlist for the women's section than for the men's section or the children's section. The music system 200 may be able to use consumer statistics 218 such as requested songs and gender or age to construct playlists for a particular channel. The consumer may also check into the system 200 and identify the department in which he is located to help determine a playlist 224 for the channel in that particular department.

In one embodiment, the music system 200 operates on a pay-to-play basis, such that the music system 200 charges consumers for each song request or for each song actually played. Consumers may set up an account with the music system 200, or the consumers may be charged via the profile management system 208. In another embodiment, the music system 200 offers rewards to consumers using the music system 200. The rewards may be based on the number of song requests made, the number of times the consumer visits the location or checks into the location, or other information. The rewards may include discounts or coupons for future purchases, and may be tailored according to consumer-specific statistics.

When the music system 200 receives a request from a consumer to play a song, the music system queues the song for playback on the music system 200—according to the filter rules 236 and availability of the song 226. In one embodiment, the music system 200 queues song requests in the order received. Alternatively, the music system 200 may randomly determine the playback order of requested songs. The music system 200 may send a notification to the mobile device 104 indicating the position of the song in the queue, and/or may indicate the estimated waiting time until the song is to be played. This may incentivize consumers to remain at the location longer until the song is played.

Although embodiments described above focus on the ability of a mobile subscriber to request playback of his or her music on the location's music system 200, some embodiments also allow a user to select music or make a request based on a library of music that is already available on the music system 200 at the location.

Figure 4:
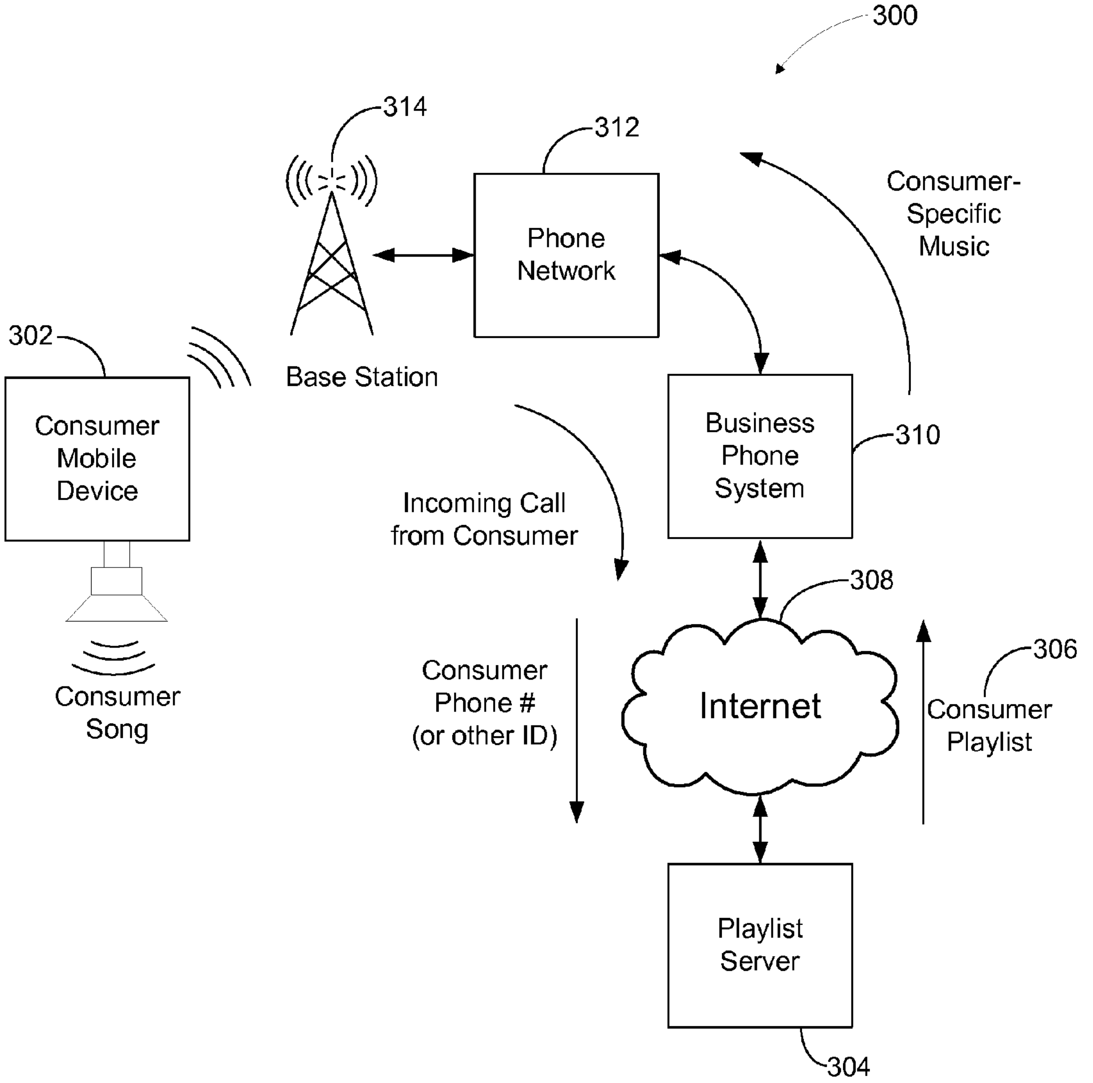
FIG. 4 shows an embodiment of a consumer-specific on-hold music playback system in which music is provided from a remote playlist server.

FIG. 4 illustrates one embodiment of an on-hold music playback system 300. In the illustrated embodiment, a user calls a third party business or residence on a consumer mobile device 302. The mobile device 302 is configured, either through a mobile or web application, to recognize the beginning of an on-hold signal from a business phone system 310 or the phone network 312 if the consumer is put on hold. Examples of recognizing the beginning or end of an on-hold status includes recognition of specific sounds, music, tones, packets, voices, etc. Additionally, a business phone system 310 may be any third party resident or business phone system. The web application receives notification that the mobile device 302 is on hold. In the illustrated embodiment, the web application communicates with a playlist server 304 requesting that a specific song or preference of songs be played on the mobile device 302. The playlist server 304 selects a song or generates a consumer playlist 306, either based on profile preferences of the mobile device 302 or specific requests of a consumer. In the illustrated example, the playlist server 304 transmits the consumer playlist 306 over the internet 308. The playlist may also be transmitted by a base station 314 or a phone network 312 or other method for transmitting digital signals. The consumer playlist 306 is played back to the consumer mobile device 302 over the business phone system 310. The mobile device 302 then plays the consumer requested song or personalized playlist through speakers or the ear-piece on the consumer's mobile device 302. The coordination of the web application with the wireless network may be through the phone network 312 or through the business phone system 310, depending on which system subscribes the services to the applicable web application. While the mobile device 302 plays music, the mobile device 302 or mobile or web application maintains communication with the business phone system 310 via a base station 314 and/or the phone network 312 and ceases playing the music when the mobile device 302 or web application recognizes the end of the on-hold status of the phone call.

Figure 5:
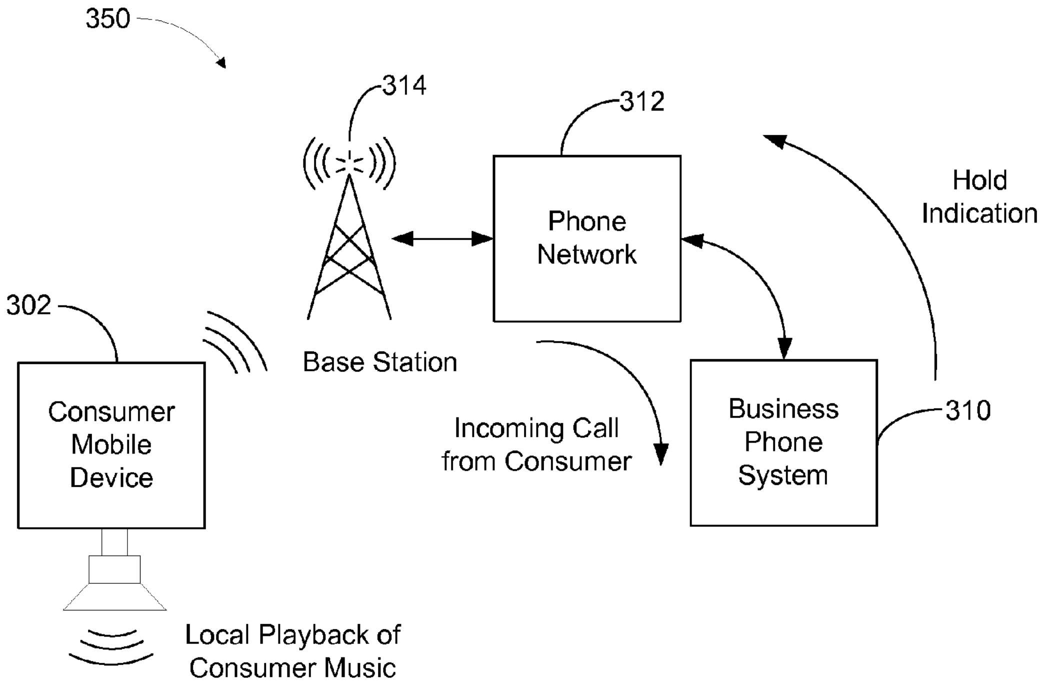
FIG. 5 shows an embodiment of an on-hold music playback system in which a consumer mobile device provides the hold music.

FIG. 5 illustrates one embodiment of an on-hold music playback system 350. In the illustrated embodiment, a user calls a business or residence on a consumer mobile device 302. The mobile device 302 is configured, either through a mobile or web application to recognize the beginning of a holding signal from a third party business or resident phone system 310 or the phone network 312 if the consumer is put on hold. Examples of recognizing the beginning or end of an on-hold status includes recognition of specific sounds, music, tones, packets, voices, etc. and may indicate an on-hold status even if the business phone system has no on-hold status in place. Additionally, a business phone system 310 may be any third party resident or business phone system. The mobile device 302 sends an input signal to a web application indicating that the mobile device 302 is on hold. In the illustrated embodiment, the web or mobile application is configured to draw upon audio files stored on the consumer mobile device 302 and play a playlist or preference of audio files through the speakers of the mobile device 302. While the mobile device 302 plays music, the mobile device 302 or mobile or web application continues to communicate with the business phone system 310 via a base station 314 and/or the phone network 312 in order to know when the user is no longer on hold and should cease playback of the holding music in order to continue the phone conversation. The mobile device is configured to recognize the end of the on-hold status, and cease playback of the music to resume the phone call. This allows a consumer to listen to music even if the business phone system 310 does not have a hold signal in place.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

Although operation of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

An embodiment of a web application includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiment of the invention can take the form of a computer program product accessible from a physical piece of hardware referred to as a computer-usable or computer-readable storage medium providing program code for use by or in connection with a computer or any instruction execution system. The computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A mobile communication device comprising:

logic at least partially implemented in hardware, wherein the logic is configured to:

facilitate a voice communication session between a user of the mobile communication device and another user of another communication device;

recognize a beginning of an on-hold status; and playback music stored on and originating from the mobile communication device to the user of the mobile communication device in response to recognizing the beginning of the on-hold status.

2. The mobile communication device of claim 1, wherein the logic is further configured to:

recognize an end of the on-hold status; and cease playback of the music in response to recognizing the end of the on-hold status.

3. The mobile communication device of claim 1, wherein the logic is further configured to implement local playback of the music at the mobile communication device.

4. The mobile communication device of claim 1, wherein the logic is further configured to coordinate with a web application for playback of the music.

5. The mobile communication device of claim 4, wherein the logic is further configured to access at least one audio file stored on the mobile communication device for playback of the audio file at the mobile communication device.

* * * * *